United States Patent [19]
Urai et al.

[11] Patent Number: 4,929,304
[45] Date of Patent: May 29, 1990

[54] METHOD FOR MANUFACTURING AUTOMOTIVE SEAT

[75] Inventors: Muneharu Urai; Hiroyuki Makino; Makoto Shimada, all of Akishima, Japan

[73] Assignee: Tachi-S Co., Ltd., Tokyo, Japan

[21] Appl. No.: 300,181

[22] Filed: Jan. 23, 1989

[30] Foreign Application Priority Data
May 31, 1988 [JP] Japan ................. 63-134071
May 31, 1988 [JP] Japan ................. 63-134072

[51] Int. Cl.$^5$ ............................................. B32B 31/20
[52] U.S. Cl. ........................ 156/245; 156/285; 156/382; 156/499; 156/500; 264/294; 425/340; 425/345; 425/353; 425/388
[58] Field of Search ............. 156/245, 285, 382, 499, 156/500; 264/294, 511, 546, 549, 550, 551, 554, DIG. 65; 425/335, 340, 342.1, 343, 345, 353, 385, 387.1, 388, 394, 398, 402, 403, 418, DIG. 201

[56] References Cited
U.S. PATENT DOCUMENTS
4,764,241  8/1988  Makino ................. 156/500

Primary Examiner—Caleb Weston
Attorney, Agent, or Firm—Browdy and Neimark

[57] ABSTRACT

An apparatus for manufacturing an automotive seat, comprising a revolvable body, plural padding securing members or plural upper molding dies provided around the revolvable body, and a horizontally movable plural lower molding dies disposed under the revolvable body, the lower molding dies being movable horizontally relative to said revolvable body.

Disclosed also is a method for manufacturing an automotive seat, using such apparatus.

According to those apparatus and method, the manufacturing steps are carried out smoothly, with one step being effected during another step, and by virtue of the lower molding dies being horizontally moved, the apparatus can be installed in a small place.

4 Claims, 9 Drawing Sheets

METHOD FOR MANUFACTURING AUTOMOTIVE SEAT

BACKGROUND OF THE INVENTION

1. Field of the Invention

The present invention relates to an apparatus and method for manufacturing an automotive seat of type comprising a preformed seat padding and a top cover member bonded to the surfaces of the foam seat padding.

2. Description of the Prior Art

Generally, among various conventional automotive seats, there has been available such a seat that is formed by bonding a top cover member to a foam sea padding or cushion member which has been formed in a mold into a predetermined seat shape together with a metallic frame, so that the top cover member is affixed over the foam padding along its uneven surface. This bonded type of seat is advantageous in that the top cover member is easily bonded to the foam seat padding or cushion member in a close contact therewith without necessity of pulling the top cover member into the seat padding by use of an anchoring member and insert wire embedded in the cushion member, which simplifies the manufacturing steps and does not cause adverse effect on the whole seat even if a partial deformation occurs in the seat during the manufacturing process, in contrast to an integrally foamed seat which is formed by foaming a foamable material together with a top cover member within a mold.

In practical, according to the above-stated bonded-type seat, a hitherto method for making the same involves placing a preformed seat padding on a lower die, applying an adhesive to the surface of the seat padding, affixing a top cover member over the seat padding, the top cover member being formed in a configuration conforming to that of the seat padding, and pressing an upper die against both top cover member and seat padding, so as to bond the top cover member to the seat padding. Those steps, however require a precision for forming the top cover member in conformity with the outer shape of the seat padding, and also require a bonding process per seat by use of a pressing means. To expedite such troublesome steps, the inventors of the present invention previously made a seat manufacturing apparatus known from 'the U.S. Pat. No. 4,764,241, according to which four lower dies are provided on a turntable which is rotatable intermittently at 90 degrees in a circular direction, the four lower dies being equally defined on the turntable in its circular direction, and the apparatus further comprises various mechanisms for supplying the top cover member to the lower dies, applying a heat to the cover member, forming same into an desired uneven shape, and pressure bonding the foam cushion member and cover member together, and, with this system, when the lower dies are rotated at 360 degrees, a complete unit of seats is produced for one automobile. Such automatical apparatus has an advantage over the foregoing prior art in terms of rapidity and smoothness in manufacturing the seat.

However, a disadvantageous aspect has been perceived even in the U.S. Pat. No. 4,764,241, in that those independently disposed four mechanisms are rather complicated in structure, and the circular arrangement of them takes up much of room around the apparatus, which is unsuitable for installation in a small space. Also, that prior art has been found disadvantageous in that the rotation of the turntable has to be stopped each time hat a new top covering member is affixed to the lower die, during which all the heating, forming and pressure-bonding mechanisms are provisionally forced to be in non-operation state, and consequently, it is a time-consuming factor that prevents a smooth and high-efficient flow of the seat assembling processes.

SUMMARY OF THE INVENTION

With the above-stated defective points in view, it is therefore a purpose of the present invention to provide an improved apparatus and method for manufacturing an automotive seat, which expedites the assemblage of the seat with high efficiency and permits the seat assemblage to be effected in a relatively small space.

To attain the above purpose, an apparatus according to the present invention, comprises a revolvable body having plural securing members each being adapted to secure a seat padding (i.e. cushion member) thereon and plural upper molding dies each being adapted to mold a top cover member into a shape generally conforming to the upper contour of the cushion member, both of the securing members and upper molding dies being provided circumferentially of the revolvable body in an alternating relation with one another, plural lower molding dies provided under the revolvable body, each of the lower molding dies having a molding surface which generally conforms to that of each of the upper molding dies as well as to the respective upper contours of the seat padding and being vertically movable by means of an elevating device towards and away from one of those upper molding dies and seat paddings disposed at the revolvable body, plural horizontally movable carriages on which mounted is the lower molding die, the horizontally movable carriages being adpated to move the lower molding dies horizontally in a rectilinear direction relative to the revolvable body, and an adhesive applicator mechanism for applying an adhesive to the outer surface of the cushion member.

In one aspect of the invention, the revolvable body has four side surfaces, each being respectively formed for mounting thereon of a first upper molding die for molding a seat-cushion top cover member, a first securing member for securing a seat-cushion padding thereon, a second upper molding die for molding a seat-back top cover member, and a second securing member for securing a seat-back padding thereon, with such an arrangement wherein those four elements are rowed in order in the rotation direction of the revolvable body, and further a pair of the lower molding dies are provided under such revolvable body. With this arrangement, one unit of the apparatus permits production of both seat cushion and seat back.

A method, based on the above-stated apparatus, in accordance wtih the present invention, basically comprises the steps of placing a first top cover member on one of the lower molding dies, raising and pressing one of the lower molding dies against the top cover member, while at the same time, appying an adhesive to a first seat padding which is previously secured on one of the upper molding dies and securing a second seat padding onto the other of the upper molding dies, after molding of the top cover member, lowering the lower molding die, revolving the revolvable body to bring the first seat padding to the position facing towards the molded first top cover member, then raising and pressing the lower molding die against the first seat padding, thereby bonding together the first top cover member and seat padding, thereafter lowering the lower molding die, then revolving the revolable body to bring next other of the upper molding die to that position facing towards the lower molding die, then securing a third seat padding on the first securing member while at the same time applying an adhesive to the second seat padding and actuating the carriages to displace the first lower molding die and bring a second lower molding die to the position under the second upper molding die on which mounted is a second top cover member, thereafter, raising and pressing the second lower molding die against the second upper molding for molding the second top cover member, and repeating the steps same with the foregoing series of first steps for bonding the second top cover member and seat padding.

It is noted that the steps of securing the seat padding on the securing member and applying an adhesive thereto may be set during the second step of raising and pressing the lower molding die against the upper one, if desired.

Accordingly, in the present invention, while one step is being carried out, another step is almost simultaneously effected, so that the revolvable body is revolved at a fixed pace without long interruption occurred by another step as found in the abovementioned prior art, and the rectilinearly provision of the lower die carriage under the revolvable body does not require much room for installation therearound, hence allowing effective installation of the apparatus in a relatively small space.

DETAILED DESCRIPTION OF PREFERRED EMBODIMENTS OF THE INVENTION

Figure 4:
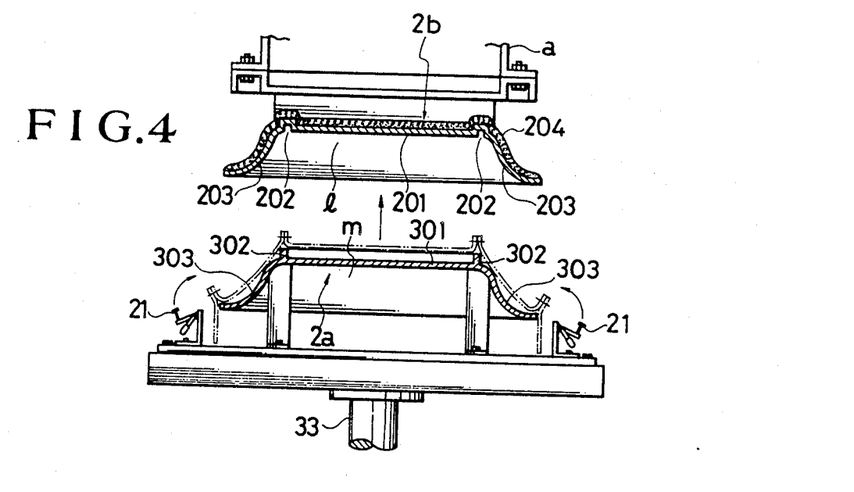
FIG. 4 is a sectional view of upper and lower molding dies.
Figure 5:
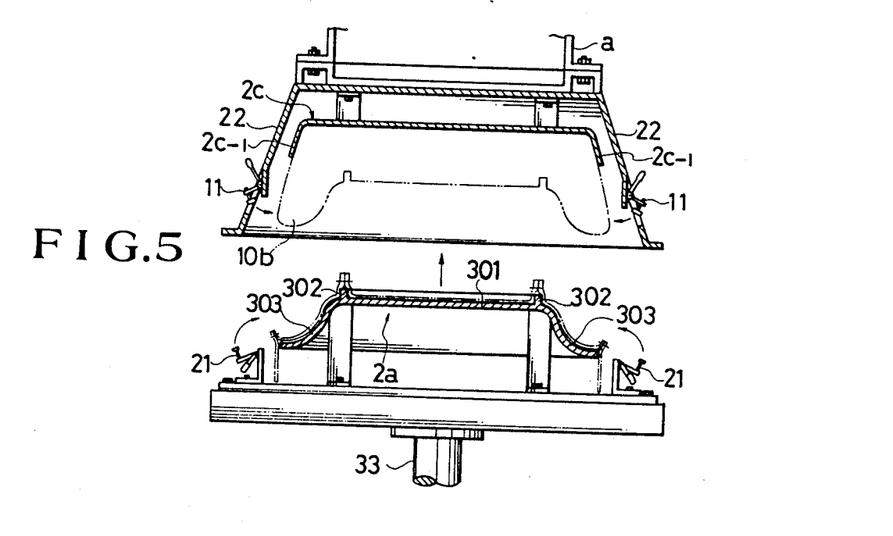
FIG. 5 is a sectional view of a seat padding securing member and the lower molding die.
Figure 6:
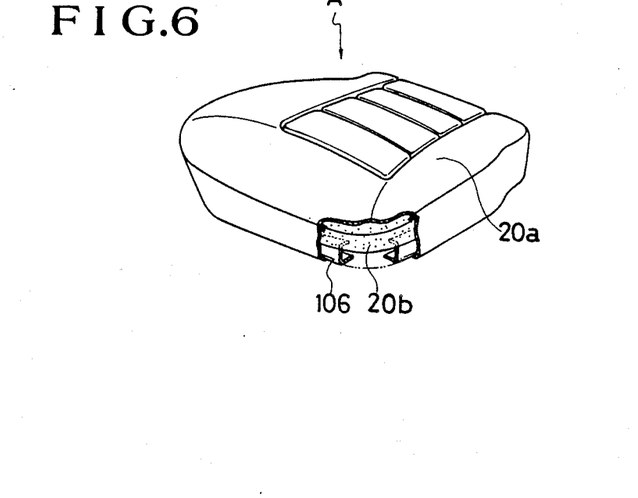
FIG. 6 is a partially broken perspective view of a seat manufactured by the present invention.
Figure 7:
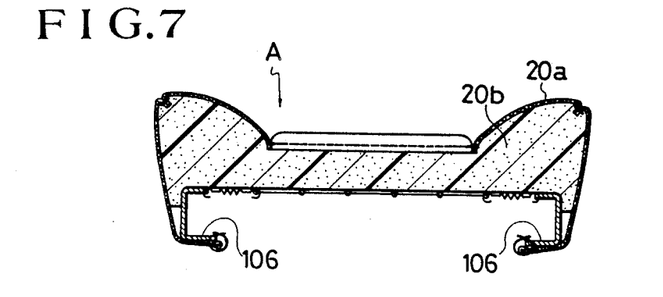
FIG. 7 is a sectional view of the seat as in the FIG. 6.

Referring to FIGS. 1(A) through 5 and FIGS. 8(A) through 8(F), illustrative are the first embodiments respectively for an apparatus and a method in accordance with the present invention, which is designed to manufacture an automotive seat as shown in FIGS. 6 and 7.

Figure 1A:
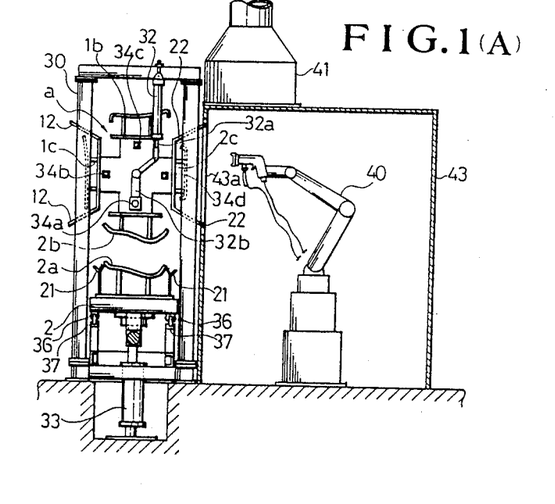
FIG. 1(A) is a partially broken side view of a first embodiment of apparatus in accordance with the present invention.

According to the first embodiment, a revolvable body (a) is supported at its both sides on a pair of rotation axles (31)(31). The rotations axles (31) (31) are connected respectively to both lateral frame sections of a housing frame (30). Thus, the revolvable body (a) is free to be revolved about the axis of the rotation axles (31). Designation (32) denotes an upper vertical hydraulic cylinder for causing the intermittent 90-degree revolving of the revolvable body (a). As shown in FIG. 1(A), four engagement members (34a)(34b)(34c)(34d) are provided at one lateral surface of the revolvable body (a), the arrangement of those members being such that they are disposed at 90-degree interval realtionship with one another in relation to the rotation axle (31) which forms a central point of their disposition. Into one of those engagement members, removably engaged is the end of dogleg-shaped arm (32b) which is further connected with the rod (32a) of the upper vertical cylinder (32), the arm (32b) being rotatably supported such as to be rotatable coaxially of the rotation axle (31). It is therefore understood that when the upper cylinder (32) is actuated to extend its rod (32a) downwardly, the arm (32b) is thereby rotated at 90 degrees from the initial point shown in FIG. 1(A) in a clockwise direction, and with the retraction of the cylinder rod (32a), the end of the arm (32) is disengaged and removed from the engagement member (34d), and returned to that initial point, thereby to be engaged into other engagement member (34d). This is not specifically shown in the drawings, because of its being already disclosed in the aforementioned U.S. Pat. No. 4,764,241, and reference is made thereto if it is desired to clearly understand it.

As seen in FIG. 1(A), circumferetially of the revolvable body (a), there are provided a first upper molding die (1b), a first padding-secuirng member (1c), a second upper molding die (2b), and a second padding-scuring member (2c) in this order, such that they are fixed to the outer surface of the revolvable body (a) at 90-degree interval relationship with one another relative to the axis of the rotation axle.

Figure 1B:
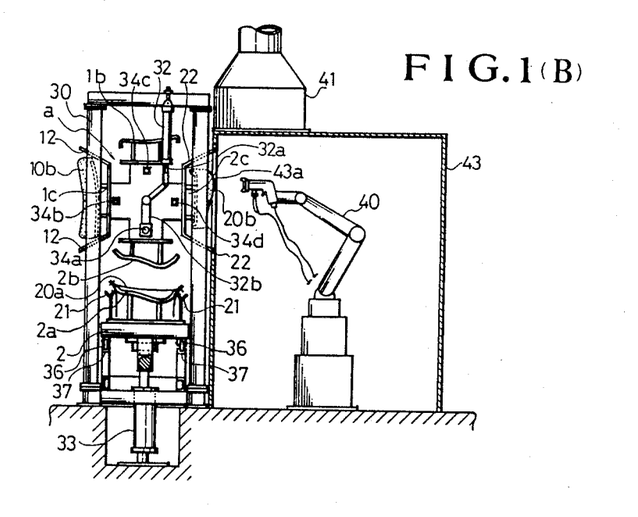
FIG. 1(B) is a partially broken side view of the apparatus in the FIG. 1, showing that seat paddings are secured thereon.
Figure 2A:
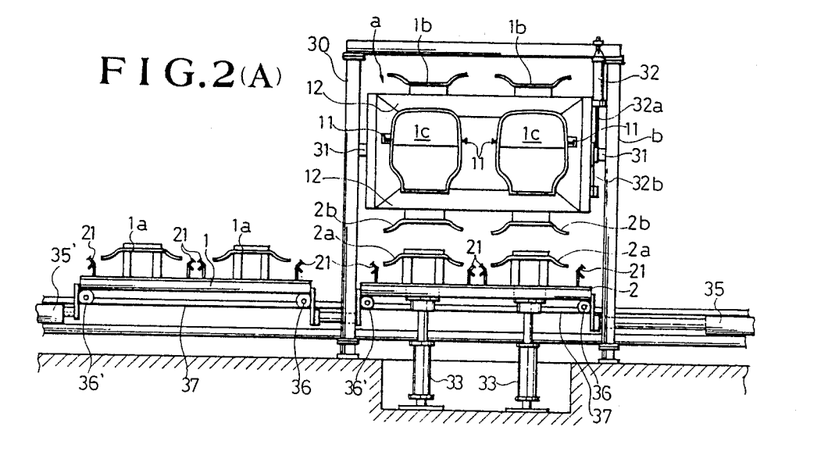
FIG. 2(A) is a partially broken front view of the first embodiment of apparatus.
Figure 2B:
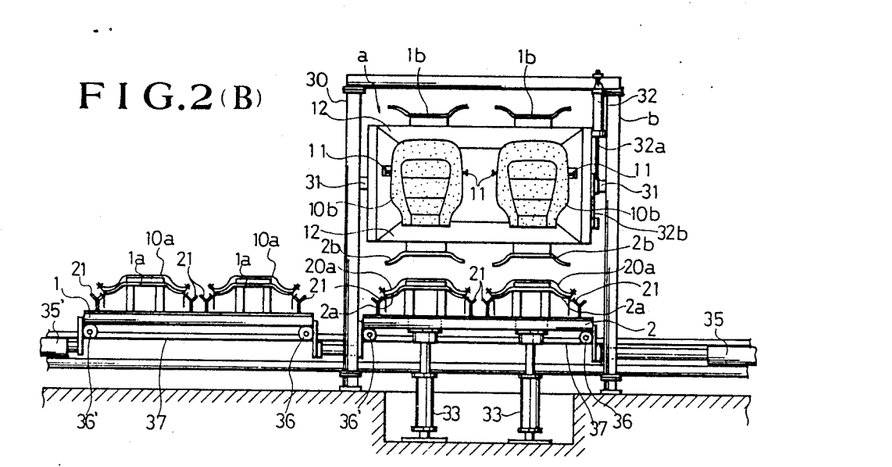
FIG. 2(B) is a partially broken front view of the apparatus in the FIG. 2, showing that seat paddings and another top cover members are mounted thereon.
Figure 8A:
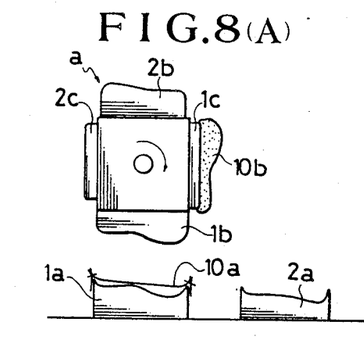
FIGS. 8(A) to 8(B) are sketchy views which roughly show a first process for manufacturing a seat by use of the first embodiment of apparatus in accordance with the present invention.
Figure 8B:
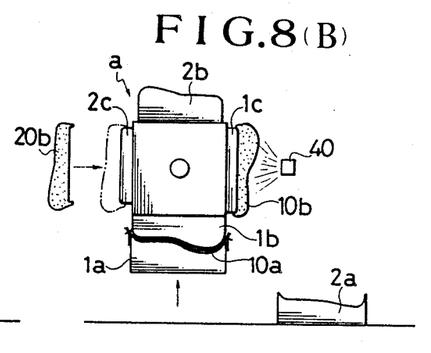

As best shown in FIGS. 1(B) and 2(B) in conjunction with FIGS. 8(A) through 8(B), the first and second upper molding dies (1b)(2b) are respectively adapted to mold and form first top cover members (10a) and second top cover members (20a), and on the other hand, the first and second padding-securing members (1c)(2c) are respectively adapted to secure thereon first seat paddings (10b) and second seat paddigns (20b). It should be noted that the first and and second seat paddings (10b)(20b) are respectively a seat-cushion padding and a seat-back padding, and as such, the first and second top cover members (10a) (20a) are respectively a seat-cushion top cover member and a seat-back top cover member, whereupon one unit of a seat (not shown) comprising a seat cushion and seat back may be assembled subsequent to the forming of each of the seat back and seat cushion in accordance with the present invention.

As in FIGS. 2(A) and 2(B), in addition to the one set of molding dies (1b)(2b) and padding-securing members (1c)(2c), there is also, on the revolvable body (a), provided another set of the same molding dies and padding-securing members as indicated by the same designations. Thus, in the shown embodiment, the provision of those two sets of upper molding dies and padding-securing members is advantageous in increasing the amount of seats to be producted.

As shown in FIG. 1(A), adjacent to the housing frame (30), provided is an adhesive applicator mechanism (40), which is a robot for automatically spraying an adhesive to each of the seat paddings including the foregoing ones (10b)(20b) under a computerized control in synchronization with the revolving of the revolvable body (a). As illustrated, the adhesive applicator mechanism (40) is accommodated within a room (43). Such room (43) has an opening (43a) through which an adhesive is applied to the seat paddings, and an exhaust duct (41) formed at its ceiling, by means of which a mist of the adhesive drifted around in the room (43) is forced out through the exhaust duct (41) so as not to harm an operator working there.

Referring, again, to FIG. 1(A), under the revolvable body (a), a lower molding die (2a) is disposed such that it is mounted on a carriage (2) which is at its bottom side provided with two pairs of spaced-apart rollers (36)(36)(36')(36') each resting on a pair of spaced-apart rails (37)(37) in a rollable manner, thereby allowing the carriage (2) to move along the rails (37)(37), so that the lower molding die (2a) on the carriage (2) is movable in a rectilinear horizontal direction with respect to the revolvable body (a). As understood from FIG. 2(A), the carriage (2) is caused to move by means of a lower horizontal cylinder (35), which will be described later. In operation, the lower molding die (2a) is positioned by the cylinder (35) in a point corresponding to that of the foregoing one set of upper molding dies (1b)(2b) and padding-securing members (1c)(2c) which are disposed at the revolvable body (a). Under such normal state, the lower molding die (2a) is further movable vertically by means of a lower vertical cylinder (33) in a direction towards and away from one of those upper dies (1b)(2b) and padding-securing members (1c)(2c).

It is noted from FIG. 2(A) that the carriage (2) is designed to mount a pair of the lower molding dies (2a) thereon, and therefore, a pair of the lower vertical sylinders (33)(33) are provided under the two lower molding dies (2a)(2a), respectively, whereby the two lower molding dies (2a)(2a) are moved in horizontal and vertical directions with respect to the above-stated two sets of upper molding dies (1b) (b) and padding-securing members (1c)(2c), respectively. As observed in FIG. 2 (A), in the embodiment, there is provided another carriage (1) in addition to the carriage (2) and further provided another lower horizontal cylinder (35) at a side opposite to the above-stated lower horizontal cylinder (36), so that both carriages (1)(2) are caused by those two opposingly disposed cylinders (35)(35') to move on the rails (37)(37) along their longitudinal directions in such a reciprocating way wherein one of the carriages (1)(2) is positioned under the revolvable body (a) while the other of them is positioned outside the revolvable body (a) for receiving a new pair of top cover members, or vice versa.

Surrounding the first and second padding-securing members (1c)(2c), provided are two hoods (12)(22), respectively, for the purpose of limiting the flying-out of the adhesive sprayed from the applicator mechanism (40).

Each of all the lower molding dies (1a)(1a)(2a) (2a) is provided with a plurality of clamps (21) therearound in order that the top cover members (10a) (20a) may be retained in place on the lower molding dies, and each of the first and second padding-securing members (1c)(2c) is also provided with a plurality of clamps (11) at their resepctive both sides for retaining in place the seat paddings (10b)(20b) thereon.

Figure 3:
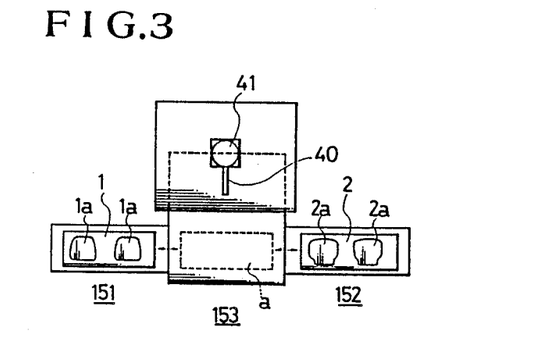
FIG. 3 is a plan view of the first embodiment of apparatus.

Referring to FIG. 3, designation (151) denotes a seat-cushion forming section in which a worker places the first top cover members (10a) (namely, the seat-cushion top cover members) on the lower molding dies (1a) and takes out a resultant bonded unit of the first top cover members (10a) and the second seat paddings (10b) (namely, the seat-cushion paddings) from the lower molding dies, designation (152) denotes a seat-back forming section in which a worker places the second top cover members (20a) (namely, the seat-back top cover members on the lower molding dies (2a) and takes out a resultant bonded unit of the second top cover members (20a) and the second seat paddings (20b) (namely, the seat-back paddings) from the same lower molding die, and designation (153) refers to a central forming section in which a worker secures the first and second seat paddings (10b)(20b) on the first and second padding-securing members (1c) (2c).

Now, the operation of the above-described apparatus will be briefly set forth as below.

Firstly, a pair of the second cover members (20a) are placed on a pair of the second lower molding dies (2a), respectively, and retained thereon by means of the clamps (21), and the second molding dies (2a) are transferred via the carriage (2) by operation of the horizontal cylinders (35)(35') to the point right under the revolvable body (a) which is in the state of directing the two second upper molding die (2b) downwardly in order for the latter to be in an operative use position. Then, the operation of the lower vertical cylinders (33)(33) causes both carriage (2) and second lower molding dies (2a) to move upwardly towards the upper molding dies (2b), respectively, whereby the second top cover members (20a) are pressed and molded between the respective upper and lower molding dies (2a)(2b) into a predetermined outer shape of seat back. During this step, an adhesive is sprayed to the surface of the second seat padding (20b) from the adhesive applicator mechanism (40). Thereafter, the lower molding dies (2a), with the second top cover members (20a) placed thereon, are lowered from the upper ones (2b) by operation of the lower vertical cylinders (33)(33), and then, the revolvable body (a) is revolved at 90 degress via the arm (32b) by operation of the upper vertical cylinder (32) so as to bring the adhesive applied second seat paddings (20b) to an operative position right above the respective second lower molding dies (2a). Next, by operating the lower vertical cylinders (31), the lower molding dies (2a) are raised so as to press the second top cover members (20a) against those second seat paddings (20b), whereupon the former members (20a) are bonded to the latter paddings (20b) in an integral manner. Thereafter, again, by operating the lower vertical cylinders (33), the second lower molding dies (2a) are lowered away from the upper molding dies (2b). Accordingly, two bonded units of those top cover members (20a) and paddings (10b) are produced, and thereafter, a seat back frame (not shown) is fixed to the padding (10b), to thereby provide a seat back (not shwon).

FIG. 4 shows a more specific structure of the above-described second upper molding dies (2b) and second lower molding dies (2a). As shown, each of the upper molding dies (2b) has such a molding surface that comprises a flat central surface region (201), a peripheral surface region (203) radially expanding from the central surface region (201), the peripheral surface region (203) having a generally S-like curved shape in section, and grooves (202) each formed in the boundary between the central and peripheral surface regions (201)(203). As such, centrally of each of the second upper molding dies (2b), there is defined a space (l) in which the second top cover member (2a) is to be molded or formed along those surface regions (201)(202)(203) into a predetermined upper contour of seat back. Numeral (204) denotes a heating device such as a nichrome wire attached on the outer surface of the upper molding dies (2b) so that the upper molding dies (2b) is to be heated by the heating device (204) for giving a heat to and softening the second top cover member (2a) for molding purpose. As to the second lower molding dies (2a), each of them has such a molding surface that conforms to the inner surfaces of the above-stated second upper molding die (2b), and thus comprises a flat surface region (301), a peripheral surface region (303) radially expanding from the central surface region (301), the peripheral surface region (303) having a generally S-like curved shape in section and projected parts (302) formed in the boundary between the central and peripheral surface regions (301)(302). The projected parts (302) is so formed as to engage into the respective grooves (202). Therefore, centrally of the second lower molding die (2a), there is defined a raised area (m) so dimensioned as to enter into the space (l) of the upper molding die (2b).

FIG. 5 shows a more specific structure of the second padding-securing members (2c). It is seen that each of the padding-securing members (2c) is fixed to the revolvable body (a) and formed in a plate-like shape with downwardly bent peripheral flanges (2c-1) provided therearound, so that the bottom surface of the second seat padding (20b) is placed thereon. The hood (22) is formed in a frust-conical shape and provided with clamps (11) in its side surface. By the clamps (11), the second seat padding (20b) is secured positively on the securing member (2c).

The above description has been roughly made of the first embodiment of apparatus, and now, reference is made to FIGS. 8(A) to FIGS. 8(I), which roughly illustrates a general process based on the use of such first embodiment of apparatus. But, it should be understood that in those FIGS. 8(A) to 8(I), one revolvable body (a) and two lower molding dies (1a) (2a) are shown in a sketchy manner for facilitating a clear understanding of the steps of method and operations of apparatus in accordance of the present invention, and therefore, the revolvable body (a) and elements associated therewith refer to the corresponding parts of the above-described appartus, and the two lower molding dies (1a)(2a) are indicative of the above-described one pair of first lower molding dies (1a)(1a) and one pair of second lower molding dies (2a)(2a), respectively. Further, it should be understood that the process shown in the FIGS. 8(A) to 8(I) is not necessarily executed by the above-described apparatus, and may be applied to another apparatus inasmuch as it is not departed from the scope of the appended claims for the invention, as will become apparent later.

Firstly, referring to FIG. 8(A), there is shown an initial step in which the first seat padding (10b) (which is made of a foam material such a foam urethane, and refers to the above-stated seat-cushion padding) has been secured on the first padding-securing member (1c) and the first top cover member (10a) (preferably formed from a stretchable material such as a knitted fabric or leather made of synthetic resin) has been placed on the first lower molding die (1a) and transferred to the operative position right under the revolvable body (a) which directs the first upper molding die (1b) downwardly, with a heat being produced from the first upper molding die (1b) through such a heating device as the foregoing one (204).

Then, as shown in FIG. 8(B), the first lower molding die (1a) with the first top cover member (1a) thereon is raised and pressed against the first upper molding die (1b), while at the same time, an adhesive is applied to the surface of the first seat padding (10b) by menas of the adhesive applicator mechanism (40) and the second seat padding (20b) (namely, the above-stated seat-back padding) is secured on the second padding-securing member (2c) disposed at the other side of the first one (1c).

Figure 8C:
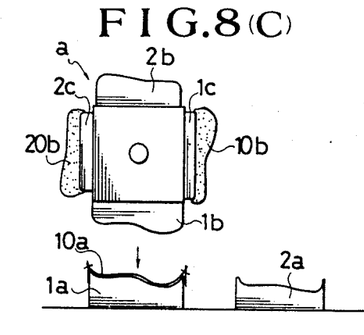
Figure 8D:
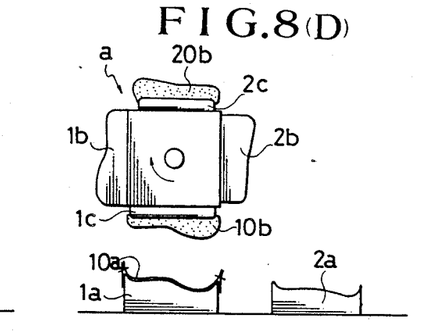

Thereafter, the first lower die (1a) is lowered away from the upper die (1b), completing the molding or forming of the first top cover member (1a) into a predetermined outer contour of seat cushion, as in FIG. 8(C), and the revolvable body (a) is revolved at 90 degree in clockwise direction as indicated by the arrow so as to bring the first seat padding (10b) to the operative position right above the first lower molding die (1a), so that the adhesive-applied surface of the padding (10b) is disposed in an opposed relation with thus-molded top cover member (10a), as seen in FIG. 8(D).

Figure 8E:
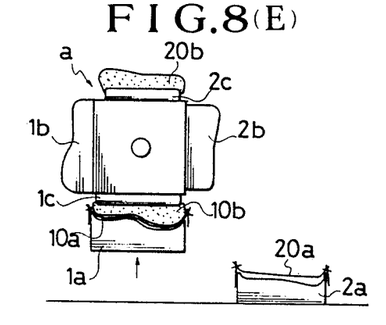

Again, the first lower molding (1a) is raised and pressed against the seat padding (10b), as in FIG. 8(E), whereupon the first top cover member (10a) is bonded to the frist seat padding (10b). During this stage, the second top cover member (20a) is placed on the second lower molding die (2a).

Figure 8F:
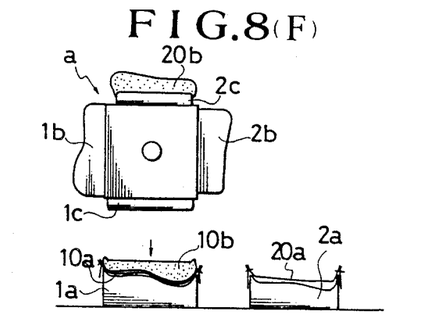

As shown in 8(F), the first lower molding die (1a) is lowered away from the upper one (1c), with the result that a bonded unit of the first top cover member and seat paddings (10a)(10b) is obtained at the lower molding die (1a).

Figure 8G:
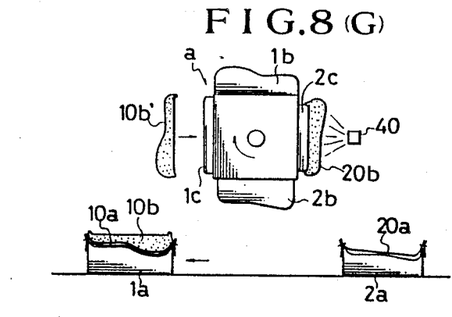

Then, as shown in FIG. 8(G), the first lower molding die (1a) with such bonded unit thereon is transferred away from the revolvable body (a) to the above-mentioned seat-cushion forming section (151) for its removal from the die (1a), during which time, the revolvable body (a) is revolved at 90 degree so as to bring the second upper molding die (2b) to the operative point, facing downwardly, and a new first seat padding (10b') is secured on the first padding-securing member (1c) while an adhesive is being applied to the surface of the second seat padding (20b) from the adhesive applicator mechanism (40).

Figure 8H:
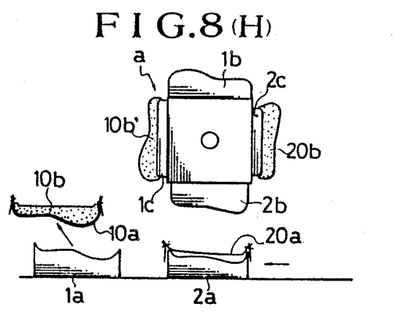
Figure 8I:
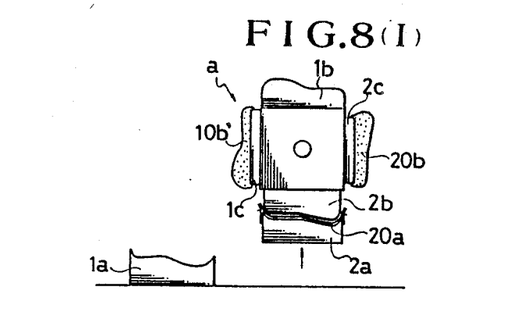

Next, as in FIG. 8(H), the second lower die (2a), on which is placed the second top cover member (20a) as stated above, is moved to the operative point right under the second upper molding die (2b), and the bonded unit of the first top cover member and seat padding (10a)(10b) is taken out from the first lower die (1a), after which, as seen in FIG. 8(I), the second lower die is raised and pressed against the second upper die (2b). Of course, the second upper die (2b) is applied a heat, likewise as in the foregoing first step shown in FIG. 8(A). Subsequent steps to be followed by such pressing step in FIG. 8(I) undergo the same sequences as illustrated in FIGS. 8(F) to 8(I), except that a new first top cover member (not shown is to be placed on the first lower molding die (1a) during the step as in FIG. 8(I) and is transferred to the operative point right under the revolvable body (a) during the step as in FIG. 8(C). Thereafter, a seat cushion frame (106) is fixed in the first seat padding (10b), and thus there is obtained a seat cushion (A) as shown in FIGS. 6 and 7.

Accordingly, it is seen that after one stroke of all the above-described steps, there are obtained one seat cushion (A) and one seat back (not shown), and the repetition of the steps results in producing many units of seat cushion and back and thus allowing a far greater number of seats.

Figure 9A:
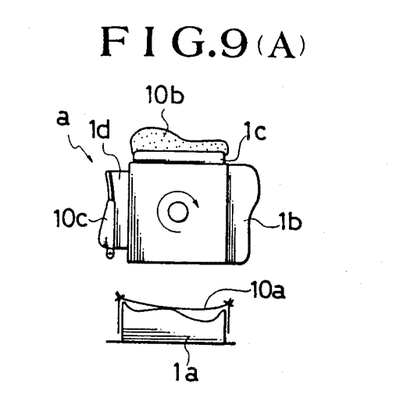
FIG. 9(A) and 9(B) are sketchy views which roughly show a second embodiment of apparatus and a second process in accordance with the present invention.
Figure 9B:
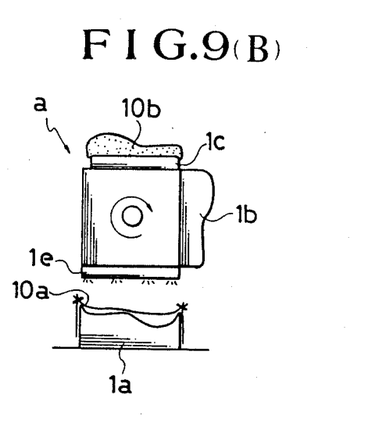
Figure 10:
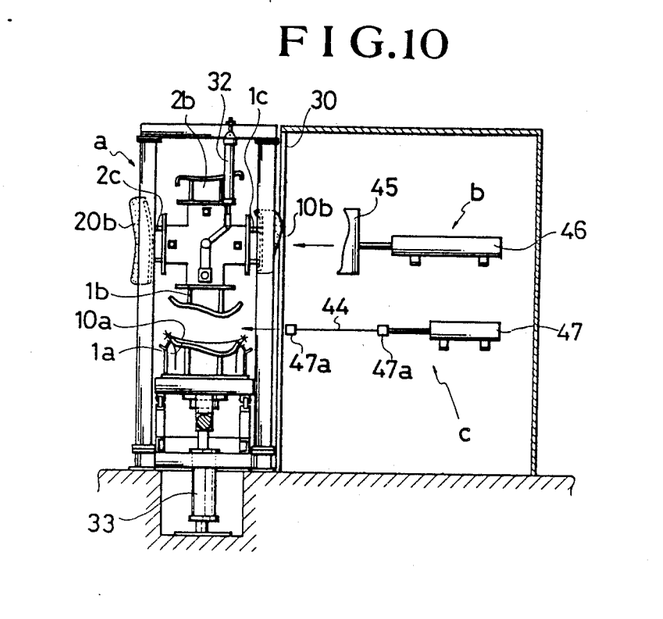
FIG. 10 is a partially broken side view of a third embodiment of the apparatus.
Figure 11A:
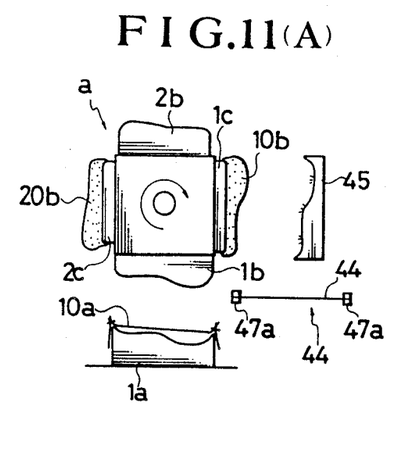
FIGS. 11(A) to 11(D) are sketchy views which roughly show a third process, using the third embodiment of apparatus.
Figure 11B:
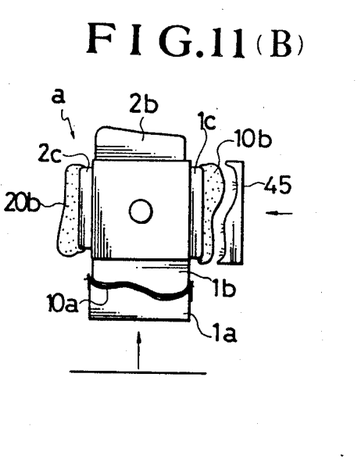
Figure 11C:
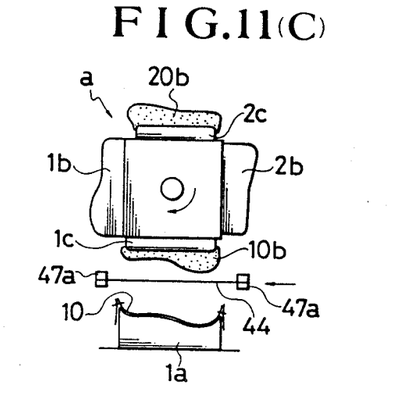
Figure 11D:
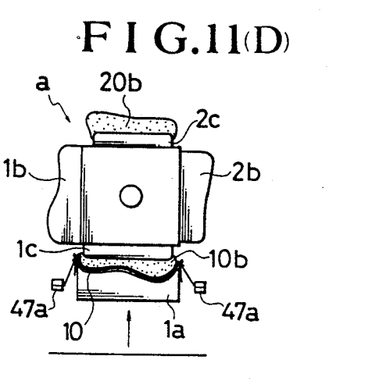

FIGS. 9(A) and 9(B) show a second embdiment of the above-described apparatus and method. This embodiment is directed to manufacturing either of the seat cushion and seat back. A specific structure of the apparatus is generally the same with that of the above-described first embodiment, except that the revolvable body (a) is formed only with three working side surfaces in contrast to the four working side surfaces of the first embodiment on which the two upper molding dies (1b)(2b) and two seat padding-securing members (1c)(2c) are provided in a manner alternating with each other.

Hereinafter, description will be given in regard to the manufacturing of the seat cushion.

Referring to FIG. 9(A), on the three working side surfaces of the revolvable body (a), there is provided a seat-cushion frame securing member (1d), a seat-cushion padding securing member (1c), and an upper molding die (1b) in order, in the clockwise direction, as shown. The seat-cushion frame securing member (1d) is adapted to secure a seat-cushion frame (10c) thereon. The seat-cushion padding securing member (1c) and upper molding die (1b) are, respectively, adapted to secure a seat-cushion padding (10b) thereon, and adapted to mold or form a seat-cushion top cover member (10a). In this particular embodiment, the first step consists of revolving the revolvable body (a) at 90 degree in the clockwise direction as indicated by the arrow, so as to bring the upper molding die (1b) to an operative position right above the lower molding die (1a), and then raising and and pressing the lower molding die (1a) against the upper molding die (1b), thereby forming the top cover member (10a) between the two lower and upper dies (1a)(1b) into a predetermined outer contour of seat cushion. Subsequent steps involves lowering the lower die (1a) from the upper one (1b) and applying an adhesive to the surface of the top cove member (10a), then revolving the revolvable body (a) at 90 degrees in the arrow direction, thereby directing the seat cushion padding (10b) towards thus-formed top cover member (10a), then raising the lower molding die (1a) to press the top cover member (10a) against the adhesive-applied padding (10b) to bond them together, then lowering the lower molding die (1a) from the upper one (1b) so that a bonded unit of the top cover member and padding (10a)(10b) is left on the lower molding die (1a), thereafter, revolving the revolvable body at 90 degrees further in the arrow direction so as to bring the seat-cushion frame securing member (1d) to the point right above such bonded unit on the lower molding die (1a). At this stage, although not shown, it is to be understood that the recessed reverse surface of the padding (10b) faces towards the seat-cushion frame (10c), and as such, by raising the lower molding die (1a) towards the padding (10b) secured on the member (1b), the frame (10c) is caused to enter into the recessed reverse surface of the padding (10b), whreupon produced is a seat cushion with the frame (10c) in the same manner as shown in FIGS. (6) and (7), without a separate subsequent steps for securing the seat cushion frame (10c) in the padding (10c).

FIG. 9(B) shows a similar embodiment to the above-stated one in FIG. 9(C), except that, on the three working surfaces of the revolvable body (a), a seat-cushion padding securing member (1c) on which the seat-cushion padding (10b) is secured, a seat-cushion upper molding (1b) and a heat irradiation device (1e) are provided in this order in the clockwise direction as indicated by the arrow. According to that embodiment, the heat irradiation device (1e) is positioned at an initial operative point right above the lower molding die (1a) on which is placed the seat-cushion top cover member (10a). Thus, at a first step, the top cover member (10a) is heated by the heat irradiation device (e) for softening purpose, and thereafter, the revolvable body (a) is revolved at 90 degrees in the arrow direction so as to bring the upper molding die (1b) to the operative point right above the heated top cover member (10a) on the lower die (1a). Next, by raising and pressing the lower die (1a) with the top cover member (10a) thereon against the upper die (1b), the top cover member (10a) is formed into a predetermined outer contour of seat cushion. Subsequent steps, like those in FIG. 9(A), involves revolving the revolvable body (a) at further 90 degrees in the arrow direction, and then raising the lower die (1a) with thus-formed top cove member (10a) towards the seat cushion padding (10b) (to which an adhesive is applied in advance), so that a bonded unit of the top cover member and padding (10a)(10b) is produced.

It is noted that in both embodiments in FIGS. 9(A) and 9(B), a seat back, instead of the seat cushion, may be produced by altering the relevant upper and lower dies to ones adapted for molding or forming the top cover member into a predetermined outer contour of seat back, and it is needless to mention that the lower molding die (1a) may be provided in plural numbers and movable horizontally in a rectiliner direction with respect to the revolvable body (a), just in the same way as in the above first embodiment.

FIGS. 10 and 11(A) through 11(D) illustrate a third embodiment of apparatus and method in accordance with the present invention. In the present embodiment, the apparatus used is the same with that of the aforementioned first embodiment, except that there are provided a heating mechanism (b) and a thermo-sensitive adhesive film supplying mechanism (c) adjacent to the housing frame (30). Specifically, the heating mechanism (b) comprises a horizontal upper cylinder (46) and a heater (45) fixed to the cylinder (46) such that the heater (45) is moved horizontally towards and away from one of the first and second padding-securing members (1c)(2c) on the revolvable body (a) by the horizontal upper cylinder (46). The heating mechanism (b) may be constructed as a heat irradiation mechanism or a heating die in which a nichrome wire is incorporated. The thermo-sensitive adhesive film supplying mechanism (c) comprises a lower horizontal cylinder (47) and a support frame (47a) of a rectangular shape (not show in detail) which is fixed to the lower horizontal cylinder (47), such that the support frame (47a) is moved by the operation of the lower cylinder (47) towards and away from between the revolvable body (a) and lower molding die (1b). In the support frame (47a), mounted is a thermo-sensitive adhesive film (44) in a manner being stretched therein. Thus, it is to be understood that both thermo-sensitive adhesive film (44) and support frame (47a) can be positioned between the revolvable body (a) and lower molding die (1b) through operation of the cylinder (47), and the first seat padding (10b) is heated by the heating mechanism (b), whereupon the heated first seat padding (10b) is easily bonded to the first top cover member (10a) by virtue of the thermo-sensitive adhesive film (44) being melt between those two elements (10b)(10a) for bonding them together, as will be described more specifically later.

Referring now to FIGS. 11(A) to 11(D), the manufacturing steps using the above-described third embodiment will be described as below. It should be noted that those figures also roughly show a principle process in accordance with the third embodiment, similarly to the FIGS. 8(A) to 8(I) for the first embodiment, and therefore do not depict the details of mechanic motion of the apparatus as stage, the heating mechanism (8) is energized to produce a heat, and the thermo-sensitive adhesive film (44) is secured in the support frame (47a). Next, the lower molding die (a) is raised and pressed against the first upper molding die (1b) so as to form the top cover member (10a) into a predetermined outer contour of seat cushion, while at the same time, the heater (45) of the heating mechanism (b) is brought to the point adjacent to the first seat padding (10b) by the operation of the lower horizontal cylinder (47), thereby subjecting the padding (10b) to a heating, as in FIG. 8(B). Thereafter, the lower molding die (1a) is lowered from the upper one (1c), and the revolvable body (a) is revolved at 90 degrees in the arrow direction, as shown in FIG. (8c), so as to bring the heated padding (10b), which has a certain high temperature therein, to the operative position right above the lower molding die (1a). During this step, the thermo-sensitive adhesive film (44) is brought to the operative point between the padding (10b) and top cover member (10a) on the lower die (1a) by means of the lower horizontal cylinder (47). Thereafter, as in FIG. 11(D), the lower die (1a) is again raised towards the upper one (1c) so that the top cover member (10a) and seat padding (10b) are pressed and bonded together. In this connection, it is seen that the termo-sensitive adhesive film (44) is melted by the heat remaining in the padding (10b) and spreaded as an adhesive between the top cover member (10a) and padding (10b) to bond them together.

After the bonding step, although not shown, the subsequent steps are such that the lower molding die (1a) is lowered from the bonded unit of the top cover member (10a) and padding (10b), and then is transferred to the seat-cushion forming section (151) for taking out the bonded unit from the lower die (1a), and that the further steps subsequent thereto consist essentially of revolving the revolvable body (a) and effecting the above-mentioned heating and bonding steps with regard to the second top cover member and seat padding (20a)(20b).

In this third embodiment, it is important to appreciate that the thermo-sensitive adhesive film (44) is melted by the heat residing in the heated padding (10b) or (20b), which eliminates additional device and step for subjecting the film (44) to a heat treatment.

Figure 12:
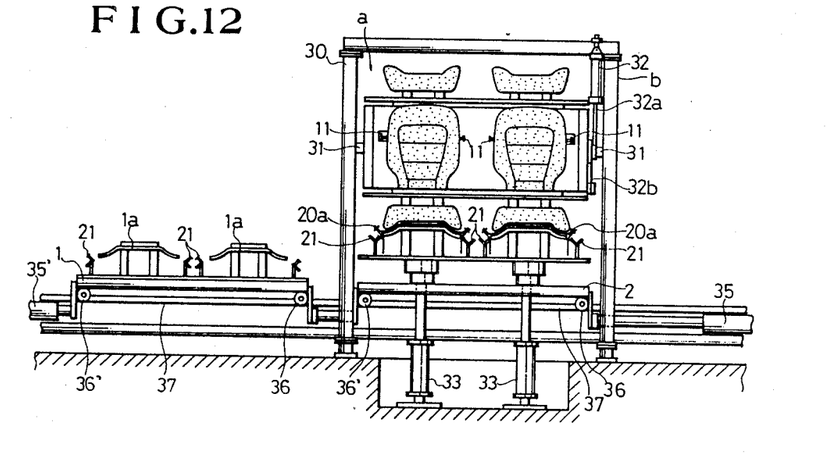
FIG. 12 is a partially broken front view of a fourth embodiment of the apparatus, in which previously molded top cover member are placed on lower molding dies, and a revolvable body has only plural secuing members for securing plural seat paddings.

FIG. 12 shows a fourth embodiment of the present invention, in which, on the four working surfaces of the revolvable body (a), there are provided a first pair of seat-padding securing members (1a)(1a), a second pair of seat-padding securing members (1b)(1b), a third pair of seat-padding securing members (1c)(1c), and a fourth pair of seat-padding securing members (1d)(1d), although the latter fourth pair of securing members (1d)(1d) are not shown in the FIG. 12, instead of the above-described alternating arrangement of two upper molding dies (1b)(2b) and two padding-securing members (1c)(2c).

According to the fourth embodiment, those four seat-padding securing members (1a)(1b)(1c)(1d) are provided for the purpose of manufacturing two pairs of seat cushion and seat back for producing two front seats and two pairs of seat cushion and seat back for producing two rear seats. The other parts and elements of the appartus used than those four securing members are the same with those of the aforementioned first embodimet.

Hence, the first pair of seat-padding securing members (1a)(1a) are adapted for securing thereon two seat-cushion paddings (2a)(2a) associated with the two front seats, respectively, the second pair of securing members (1b)(1b) are adapted for securing thereon two seat-cushion paddings (2b)(2b) associated with the same two front seats, respectively, the third pair of securing members (1c)(1c) are adapted for securing thereon two seat-back paddings (2c)(2c) associated with the two rear seats, respectively, and the fourth pair of securing members (1d)(1d) (not shown) are adapted for securing thereon two seat-back paddings (2d)(2d) (not shown, but designated accordingly for clarification purpose here), respectively.

All top cover members to be bonded with the respective paddings (2a)(2b)(2c)(2d), inclusive of two first top cover members (6a)(6a) shown in FIG. 12, have been molded, formed or sewn in advance into predetermined outer contours of the respective two front-seat seat cushions and two front-back seat backs, and are to undergo the steps of their being placed on the respective lower molding dies (1a)(1a)(1b)(1b).

In operation, at an initial step, a first pair of the top cover members (6a)(6a) for the two front-seat seat cushions are placed on a pair of first lower molding dies (1b)(1b), respectively, and are transferred horizontally to the operative position below the revolvable body (a), and on the other hand, all the above-mentioned seat paddings (2a)(2b)(2c)(2d) are secured on the securing members (1a) (1b) (1c) (1d), respectively. Then, the subsequent steps involve applying an adhesive to the respective outer surfaces of the first pair of paddings (2a)(2a), then revolving the revolvable body (a) at 90 dgrees to bring the first pair of paddings (2a)(2a) to the operative point right above (he respective pairs of top cover members (6a)(6a), then raising the lower molding dies (1b)(1b) towards the paddings (2a)2a) so as to bond the top cover members (6a)(6a) and the paddings (2a)(2a) together, respectively, just as shown in FIG. 12, whereupon one bonded unit of the two elements (6a)(2a) and another bonded unit of the two elements (6a)(2a) are produced on the respective two lower dies (1b)(1b). Next, the first lower dies (1a)(1a) are retracted from the operative point and the first lower dies (1a)(1a) are transferred to the operative point right below the revolvable body (a). The subsequent steps are to be followed in the same manner with the above-described steps until all bonded units of top cover member and cushion member are produced for another two front seats and two rear seats, although not shown in detail.

Figure 13:
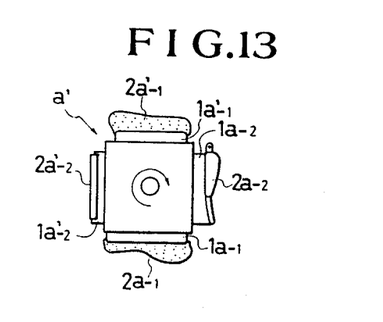
FIG. 13 is a sketchy view showing a fifth embodiment of the apparatus.

FIG. 13 shows a fifth embodiment of the present invention, wherein there is provided a different revolvable body (a') than the above-discussed one, the arrangement of such revolvable body (a') being such that, on its four working surfaces, disposed are a seat-back padding securing member (1a-1), a a seat-back frame securing member (1a-2), a seat-cushion padding securing member (1a'-1), and a seat-cushion frame securing member (1a'-2), in this order, in the clockwise direction as indicated by the arrow. As shown, the seat-back padding securing member (1a-1) is adapted to secure thereon a seat back padding (2a'-1), the seat-back frame securing member (1a-2) is adapted to secure thereon a seat back frame (2a-2), the seat-cushion padding securing member (1a'-1) is adapted to secure thereon a seat cushion padding (2a'-1), and the seat-cushion frame securing member (1a'-2) is adapted to secure thereon a seat cushion frame (2a'-2). The details of the operation and steps in the present embodiment are not shown clearly, but it should be understood that if corresponding seat-cushion and seat-back top cover members are bonded to the respective paddings (2a'-1)(2a-1), using the previously stated apparatus of the above first embodiment, substantially following the steps of the second embodiment in FIG. 9(A) except the molding step for forming the top cover member, then, provided is one unit of seat cushion and seat back for producing one seat. In other words, after one round of assembling processes, both seat cushion and seat back are produced and therefore, one seat can easily be obtained. Repetition of those steps will lead to a number of complete seats being produced, with a far more rapidity and smoothness.

Figure 14:
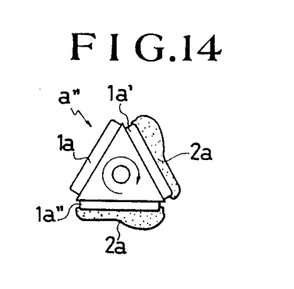
FIG. 14 is a sketchy view showing a sixth embodiment of apparatus, in which a revolvable body is formed in a triangle shape, whose three surfaces are adapted for mounting two seat-padding secuirng members and one upper molding die thereon.

FIG. 14 illustrates a sixth embodiment of the present invention. In this particular embodiment, there is provided a revolvable body (a") of generally equilateral triangular shape, which is so constructed that, on its three working surfaces, disposed are three padding-securing members (1a)(1a')(1a") in the arrow direction. The apparatus used here is also the same with the foregoing first embodiment, but the revolvable body (a") is programmed to revolve at 120 degrees intermittently so as to bring each of the three padding-securing members (1a)(1a')(1a") to an operative position right above the respective lower dies (1a) or (2b). The manufacturing steps are to be carried out substantially in accordance with those of the above-stated fourth embodiment in FIG. 12.

This sixth embodiment is effective in producing a number of seat cushions or seat backs at a relatively high rate, and it is optional that all seat-cushion paddings (2a) are only secured on the three securing members (1a)(1a')(1a") for sole production of seat cushions, by altering all the lower dies (1a)(2b) into ones for seat cushion contour, or all seat-back paddings (not shown) are secured on those three securing members, for sole production of seat backs, by altering all the lower dies (1a)(2b) into ones for seat back contour.

From the above descriptions, according to the present invention, the undermentioned adavatages are attained.

(1) The lower molding dies are arranged horizontally in a rectilinear direction relative to the revolvable body on which mounted are seat-padding securing members and upper molding dies, and therefore, the apparatus on the whole does not take up much of room as compared with the above-mentioned prior arts, which means that the installation area of the apparatus is reduced, thus allowing the apparatus to be installed in a small space. Further, operators or workers can form a line along the apparatus and operate it with much effective and ease, (2) According to the step flow of the present invention, it is seen that, while one step is being carried out, another step is almost simultaneously effected, without unrhythmical interruption. For example, referring to FIG. 8(B), it is observed that while the top cover member (10a) is being pressed against the upper molding die (1b) for forming by means of the lower molding die (1a), a new padding (20b) is secured on the second securing member (2c) and at the same time, an adhesive is applied to the surface of the padding (10b). Thus, the revolvable body is revolved at a fixed pace in harmony with the vertical movement of the lower molding dies, without such time-consuming interruption occured until completion of another step as found in the prior art. The operation flow is therefore greatly improved, permitting a far effective and rapid cycle of seat manufacturing steps. Alteration or modification of the padding securing members, upper molding dies and lower molding dies, as shown in the above various embodiments, provides the possibility to expedite the manufacturing of particular seats, seat backs or seat cushions.

While having described the invention as above, it should be understood that other various modifications, replacements or addings may structurally be possible without departing from the spirit and scope of the appended claims for the invention.

What is claimed is:

1. A method for manufacturing an automotive seat, which uses an apparatus comprising a revolvable body, a plurality of upper molding dies, a plurality of padding securing members, such that said upper molding dies and padding securing members are provided on said revolvable body in a manner alternating with each other, and a plurality of lower molding dies disposed under said revolvable body, said lower molding dies being movable horizontally relative to said revolvable body and having a surface corresponding in shape to an outer contour of said seat, said method comprising the steps of:

placing a top cover member on one of said lower molding dies;

raising said one of said lower molding dies towards one of said upper molding die so as to press said top cover member against the latter, to thereby mold said top cover member into said outer contour of said seat, while at the same time, securing a seat padding on one of said padding securing members;

then, lowering said one of said lower molding dies, while at the same time, revolving said revolvable body to bring said seat padding to a mutually faced relation with said one of said lower molding dies; and then, again, raising said one of said lower molding dies with said top cover member placed thereon towards said seat padding so as to bond said top cover member to said seat padding in an integral manner.

2. The method according to claim 1, wherein said method further comprises the step of applying an adhesive to said seat padding secured on said padding securing member during said step of raising said one of said lower molding dies towards one of said upper molding die so as to press said top cvoer member against the latter.

3. A method for manufacturing an automotive seat, which uses an apparatus comprising a revolvable body, a plurality of upper molding dies, a plurality of padding securing members, such that said upper molding dies and padding securing members are provided on said revolvable body in a manner alternating with each other, and a plurality of lower molding dies disposed under said revolvable body, said lower molding dies being movable horizontally relative to said revolvable body and having a surface corresponding in shape to an outer contour of said seat, said method comprising the steps of:

securing in advance a first seat padding on one of said padding securing member of said revolvable body, while bringing a first one of said lower molding dies, on which is placed a first top cover member, to an operative position under a first one of said upper molding dies;

then, raising first one of said lower molding dies towards said first one of said upper molding dies so as to press said first top cover member against the latter for molding said top cover member into a predetermined outer contour of seat, while at the same time, securing a second seat padding on the other of said padding securing members of said revolvable body;

lowering said first one of said lower molding dies;

revolving said revolvable body to bring said first seat padding to an operative position above said first one of said lower molding dies;

again raising said first one of said lower molding dies towards said first seat padding so as to bond said first top cover member to the latter, while at the same time, placing a second top cover member on a second one of said lower molding dies;

thereafter, lowering said first one of said lower molding dies; and then, transferring said first one of said lower molding dies horizontally away from said revolvable body and transferring said second one of said lower molding dies, with said second top cover member placed thereon, to an operative position under said revolvable body, while at the same time, securing a third seat padding on one of said padding securing members.

4. The method according to claim 3, wherein said method further comprises the step of applying an adhesive to said first seat padding secured on said one of said padding securing member during said step of raising said first one of said lower molding dies, and the step of applying an adhesive to said second seat padding secured on said other of said upper molding dies.

* * * * *